United States Patent
Nakai et al.

(10) Patent No.: US 12,188,885 B2
(45) Date of Patent: Jan. 7, 2025

(54) EVALUATION DEVICE

(71) Applicant: Kioxia Corporation, Tokyo (JP)

(72) Inventors: Takehiro Nakai, Yokkaichi Mie (JP); Yumiko Yamashita, Yokkaichi Mie (JP); Ippei Kamiyama, Yokkaichi Mie (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/892,313

(22) Filed: Aug. 22, 2022

(65) Prior Publication Data

US 2023/0288351 A1    Sep. 14, 2023

(51) Int. Cl.
*G01N 23/207* (2018.01)

(52) U.S. Cl.
CPC ..... *G01N 23/207* (2013.01); *G01N 2223/056* (2013.01); *G01N 2223/646* (2013.01)

(58) Field of Classification Search
CPC ........... G01N 23/207; G01N 2223/056; G01N 2223/646; G01N 2223/0566; G01N 2223/6462; G01N 23/2055
See application file for complete search history.

(56) References Cited

U.S. PATENT DOCUMENTS

| | | | | |
|---|---|---|---|---|
| 6,385,289 B1 * | 5/2002 | Kikuchi | ................. | G01N 23/20 378/70 |
| 2012/0140890 A1 * | 6/2012 | Ozawa | ................. | G01N 23/207 378/74 |
| 2015/0146858 A1 * | 5/2015 | Omote | ............. | G01N 23/20025 378/74 |
| 2021/0063326 A1 * | 3/2021 | Matsushima | ........ | G01N 23/207 |
| 2021/0181126 A1 * | 6/2021 | Kobayashi | ........... | G01N 23/207 |
| 2022/0065802 A1 | 3/2022 | Kuge et al. | | |

FOREIGN PATENT DOCUMENTS

| | | | | |
|---|---|---|---|---|
| CN | 1884639 A | * | 12/2006 | |
| CN | 105866151 A | * | 8/2016 | ........... G01N 23/207 |
| JP | H09-145641 A | | 6/1997 | |
| JP | 2011-108801 A | | 6/2011 | |
| JP | 2022-042175 A | | 3/2022 | |

OTHER PUBLICATIONS

Translation of CN-1884639-A (Year: 2006).*
Translation of CN 105866151 A (Year: 2016).*

* cited by examiner

*Primary Examiner* — David P Porta
*Assistant Examiner* — Mamadou Faye
(74) *Attorney, Agent, or Firm* — Foley & Lardner LLP

(57) ABSTRACT

An evaluation device includes an X-ray diffraction measuring device configured to acquire a first X-ray locking curve having a first main peak and a first sub-peak partially overlapping the first main peak by measuring an X-ray locking curve of a first portion of a sample having a crystalline material. The evaluation device includes an analysis device configured to separate the first sub-peak from the first main peak, perform first evaluation of a crystal defects or distortion of the sample based on a peak position, peak intensity, or a half width of the separated first sub-peak, and output the first evaluation.

12 Claims, 15 Drawing Sheets

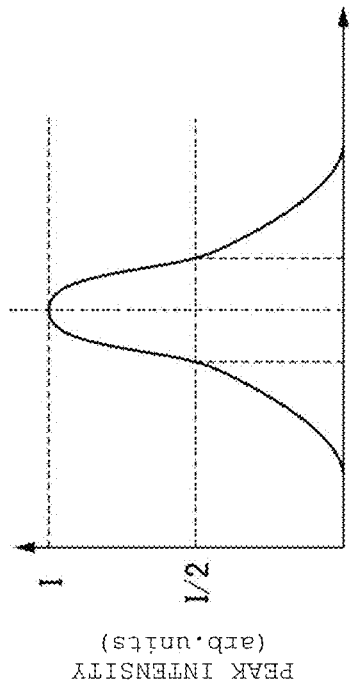
FIG. 4A
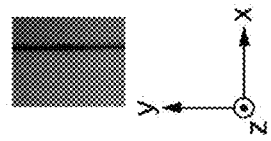
FIG. 4D High angle
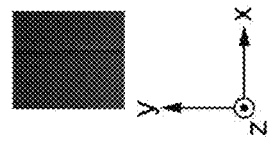
FIG. 4C just Bragg
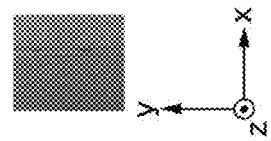
FIG. 4B Low angle

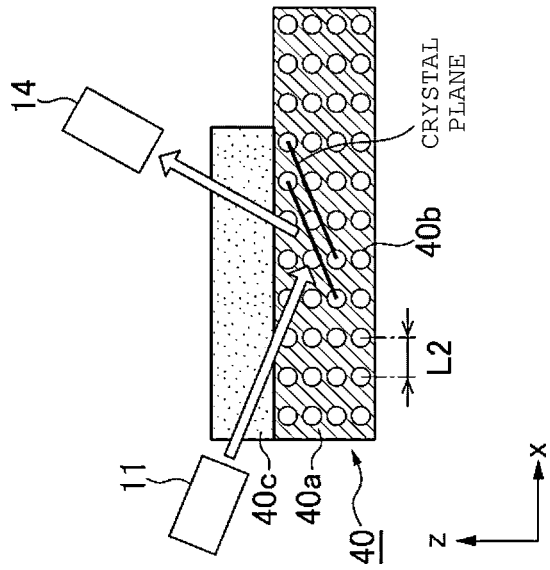
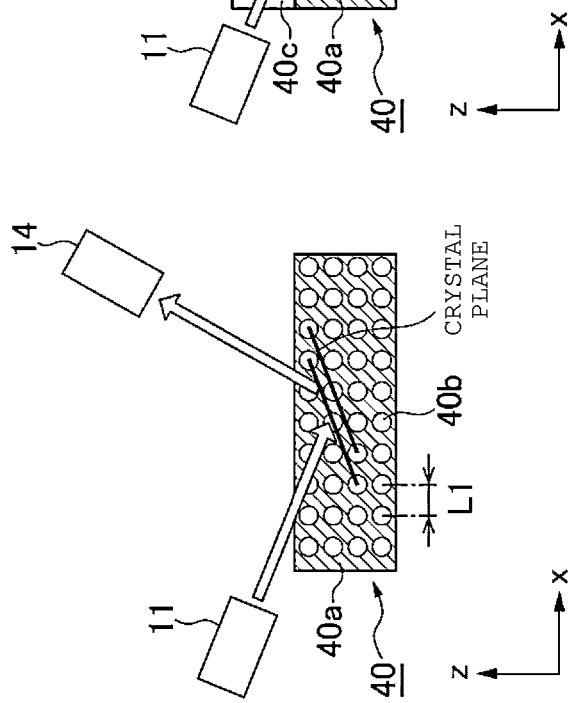

EVALUATION DEVICE

CROSS-REFERENCE TO RELATED APPLICATION

This application is based upon and claims the benefit of priority from Japanese Patent Application No. 2022-037614, filed Mar. 10, 2022, the entire contents of which are incorporated herein by reference.

FIELD

Embodiments described herein relate generally to an evaluation device.

BACKGROUND

The sample is evaluated by X-ray diffraction measurement.

DESCRIPTION OF THE DRAWINGS

FIGS. 4A to 4D are schematic diagrams illustrating a result of evaluating a sample by an evaluation device based on a topograph imaging method, in a comparative embodiment of the first embodiment.

FIGS. 5A and 5B are schematic diagrams illustrating evaluation of a sample including a substrate and a thin film formed on the substrate.

DETAILED DESCRIPTION

Figure 1:
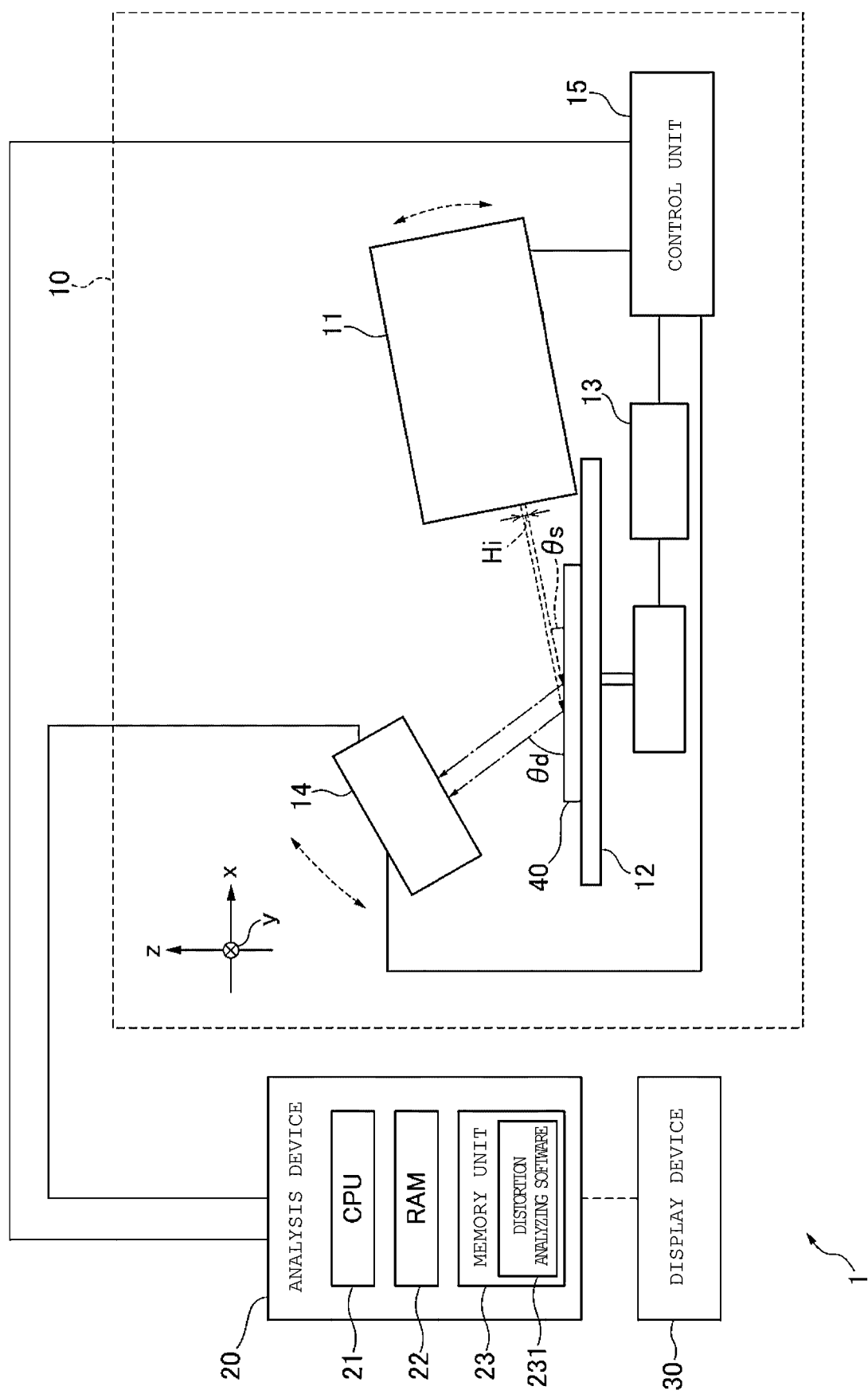
FIG. 1 is a block diagram illustrating a configuration example of an evaluation device according to a first embodiment.

Embodiments provide an evaluation device capable of performing precise evaluation.

In general, according to one embodiment, an evaluation device includes an X-ray diffraction measuring device configured to acquire a first X-ray rocking curve having a first main peak and a first sub-peak partially overlapping the first main peak by measuring an X-ray rocking curve of a first portion of a sample having a crystalline material. The evaluation device includes an analysis device configured to separate the first sub-peak from the first main peak, perform first evaluation of crystal defects or distortion of the sample based on a peak position, a peak intensity, and a half width of the separated first sub-peak, and output the first evaluation.

Hereinafter, embodiments will be described with reference to the drawings. In the drawings, the same or similar portions are designated by the same or similar reference numerals.

First Embodiment

FIG. 1 is a block diagram illustrating a configuration example of an evaluation device 1 of the present embodiment. The evaluation device 1 of the present embodiment is an evaluation device based on a rocking curve method for obtaining an incident angle distribution of diffraction intensity from part of a sample. The evaluation device 1 provides an X-ray diffraction measuring device 10 and an analysis device 20. The evaluation device 1 of the present embodiment is used for evaluation of, for example, a sample 40. Here, the sample 40 is a silicon wafer on which a pattern of a memory cell array or the like of a NAND memory having a three-dimensional structure is formed. Further, the evaluation device 1 may further provide a display device 30 for displaying an evaluation result.

The X-ray diffraction measuring device 10 includes an X-ray irradiation unit 11, a sample stage 12, a stage driving unit 13, an X-ray detection camera 14, and a control unit 15. The X-ray diffraction measuring device 10 irradiates an inspection region of the sample 40 with monochromatic X-rays with good parallelism and measures intensity (diffracted light intensity) of diffracted X-rays generated from the sample 40 by using an X-ray camera. By measuring an incident angle of X-rays while scanning the incident angle, change characteristics (X-ray rocking curves) of the diffracted light intensity on the incident angle can be acquired for each pixel of the X-ray camera.

The X-ray irradiation unit 11 provides an X-ray source (not illustrated), a multilayer film focusing mirror, a monochromator, and a slit. The X-ray source includes, for example, a rotation cathode type target (for example, Cu, Mo, or the like) and a filament for generating an electron beam. When a target is irradiated with an electron beam generated from the filament and accelerated by a high voltage, X-rays are emitted from a target metal. The multilayer film focusing mirror monochromatizes and parallelizes the X-rays emitted from the X-ray source to increase intensity. The monochromator is, for example, a double crystal monochromator and further increases degree of parallelization of X-rays incident from the multilayer film focusing mirror to the extent that lattice spacing of an element to be measured can be acquired. The slit limits a range in which the X-rays incident from the monochromator irradiate the sample 40. Specifically, the range of X-rays that irradiate the sample 40 is limited to a width direction Hi and a depth direction Li. That is, assuming that an incident angle of X-rays on the sample 40 is θs, the range (irradiation region) in which the X-rays irradiate the sample 40 is a rectangular region where the x direction is Hi/sin θs and the y direction is Li. In the following, the X-ray irradiation unit 11 has a configuration in which the incident angle θs of X-rays on the sample 40 can be changed in a predetermined range.

Figure 2:
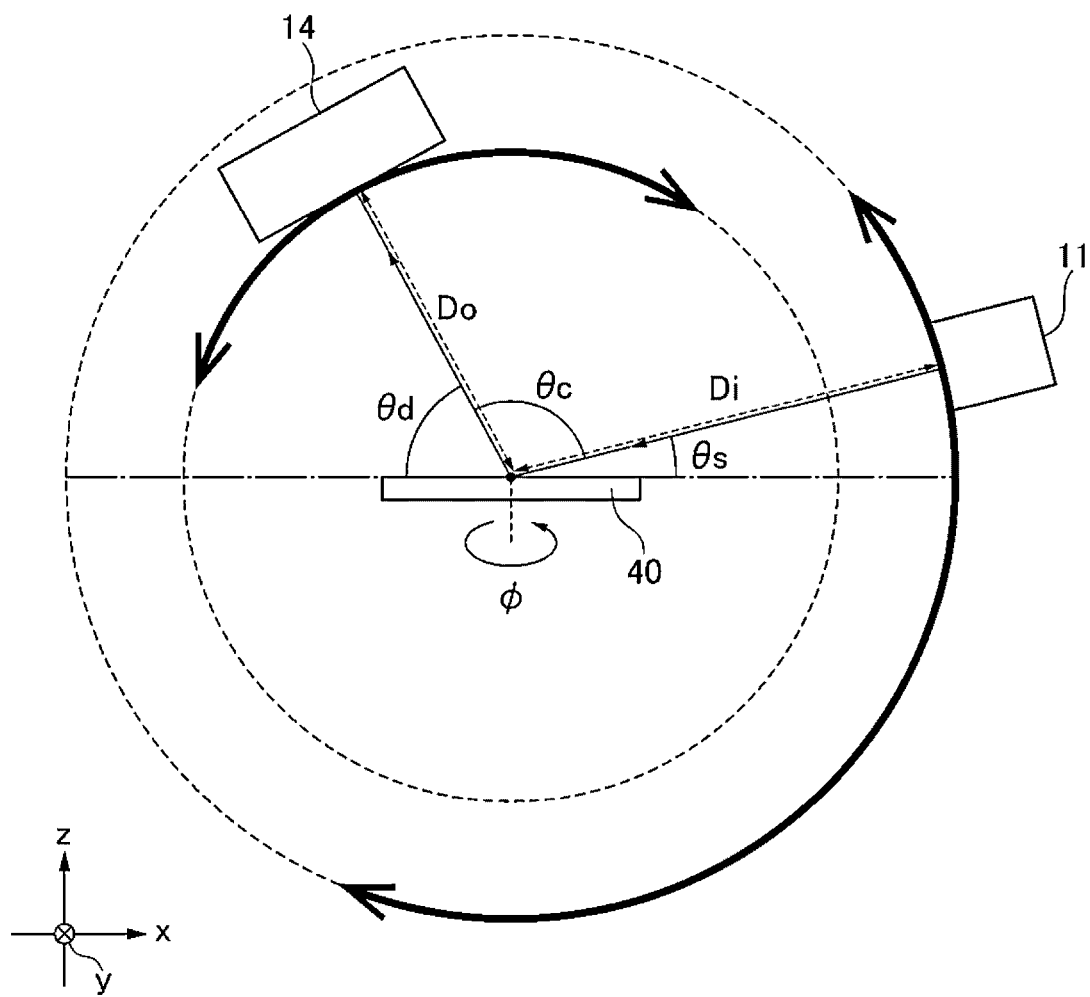
FIG. 2 is a schematic diagram illustrating a positional relationship between an X-ray irradiation unit, a subject, and an X-ray detection camera.

FIG. 2 is a schematic diagram illustrating a positional relationship between the X-ray irradiation unit 11, the sample 40, and the X-ray detection camera 14. As illustrated in FIG. 2, for example, by setting a central position of an X-ray irradiation region in the sample 40 as a center and maintaining constant a distance Di from a slit (not illustrated) to the central position of the irradiation region in the sample 40, the X-ray irradiation unit 11 is rotatable in an xz plane.

The X-ray detection camera 14 receives the diffracted X-rays generated from the sample 40 and generates a signal according to intensity of the received diffracted X-rays. The X-ray detection camera 14 includes a plurality of semiconductor detection elements (solid-state imaging elements or the like) arranged in, for example, a two-dimensional array. For example, charge coupled devices (CCDs) or CMOS image sensors are used as the semiconductor detection elements. The diffracted X-rays generated from irradiation X-rays in the irradiation region of the sample 40 are photoelectrically converted by the semiconductor detection elements disposed in a projection region of the X-ray detection camera 14 and output as an imaging signal.

As illustrated in FIG. 2, for example, by setting the central position of the X-ray irradiation region in the sample 40 as a center and maintaining constant a distance Do from the central position of irradiation region in the sample 40 to the projection region of the X-ray detection camera 14, the X-ray detection camera 14 is rotatable in the xz plane. Specifically, a position of the X-ray detection camera 14 is adjusted according to a rotation state of the X-ray irradiation unit 11 so as to make constant an angle θc between a direction of the X-rays irradiated on the sample 40 and a line connected the central position of the X-ray irradiation region in the sample 40 to the central position of the projection region of the X-ray detection camera 14. The adjustment of the position of the X-ray detection camera 14 is called ω (omega) scan. For example, when the X-ray irradiation unit 11 and the X-ray detection camera 14 are fixed and the sample 40 is rotated in the xz plane, the angle θs (an angle ω (omega)) of the X-rays incident on the sample 40 can be changed while a difference (2θ) between an angle of an X-ray reflected by the sample 40 and an angle of an X-ray incident on the sample 40 are fixed. Such measurement is called measurement by the ω (omega) scan. Further, even when the sample 40 is not rotated in the xz plane, the measurement by the ω (omega) scan can be performed by appropriately rotating the X-ray irradiation unit 11 and the X-ray detection camera 14.

The sample stage 12 (FIG. 1) can be moved in two directions (the x direction and the y direction) parallel to a surface of the sample stage 12 by the stage driving unit 13 such as a motor. By moving the sample stage 12 in the x direction and/or the y direction, the irradiation region of the sample 40 can be scanned. Further, as illustrated in FIG. 2, the sample stage 12 is rotatable at a predetermined angle φ in the xy plane.

The control unit 15 (FIG. 1) controls the entire operation of the X-ray diffraction measuring device 10. Specifically, for example, the control unit 15 controls rotations of X-rays of the X-ray irradiation unit 11 according to a change of the incident angle θs or controls rotation of the X-ray detection camera 14 according to the rotation of the X-rays of the X-ray irradiation unit 11. Further, the control unit 15 controls parameters and the like of each part constituting the X-ray irradiation unit 11, and further instructs the stage driving unit 13 to move (move in parallel in the xy plane) or rotate (rotationally move in the xy plane) a stage position so as to adjust a position where the X-ray is incident on the sample 40.

The control unit 15 (FIG. 1) transmits location information of the sample stage 12, that is, an incident position (coordinates) of the X-ray in the sample 40 to the analysis device 20. Then, the control unit 15 receives initial setting information for acquiring an X-ray rocking curve and change information of each setting content from the analysis device 20.

The analysis device 20 (FIG. 1) is, for example, a computer. The analysis device 20 provides a central processing unit (CPU) 21, a RAM 22, and a memory unit 23. The analysis device 20 performs analysis processing (analysis and evaluation) of data (an electrical signal having a magnitude corresponding to detection intensity of the diffracted light output from each pixel of the X-ray detection camera 14) input from the X-ray diffraction measuring device 10, an incident position (coordinates, the incident angle θs) of the X-ray of the sample 40 output from a control unit 15, and an X-ray rocking curve. Further, the analysis device 20 outputs a result of the analysis processing (analysis and evaluation).

The CPU 21 (FIG. 1) operates according to a program stored in the memory unit 23 and controls each portion of the analysis device 20. The RAM 22 stores data input from the X-ray diffraction measuring device 10 and stores a result obtained by executing a program described below.

The memory unit 23 stores software 231 for operating the X-ray diffraction measuring device 10 to acquire and analyze a desired X-ray rocking curve. The software 231 is read into the RAM 22 to be loaded and executed by the CPU 21, and thus, an X-ray rocking curve is evaluated. As a result of the evaluation, for example, a position of the sample 40 on which evaluation was performed can be two-dimensionally mapped to be displayed. An output destination of the result of the evaluation may be, for example, the display device 30. The analysis device 20 may be configured to cause an operation realized by the software 231 to be performed by one or more processors (not illustrated) configured as hardware. A processor that performs the operation realized by the software 231 may be, for example, a processor configured as an electronic circuit or a processor configured with an integrated circuit such as a field programmable gate array (FPGA).

Figure 3B:
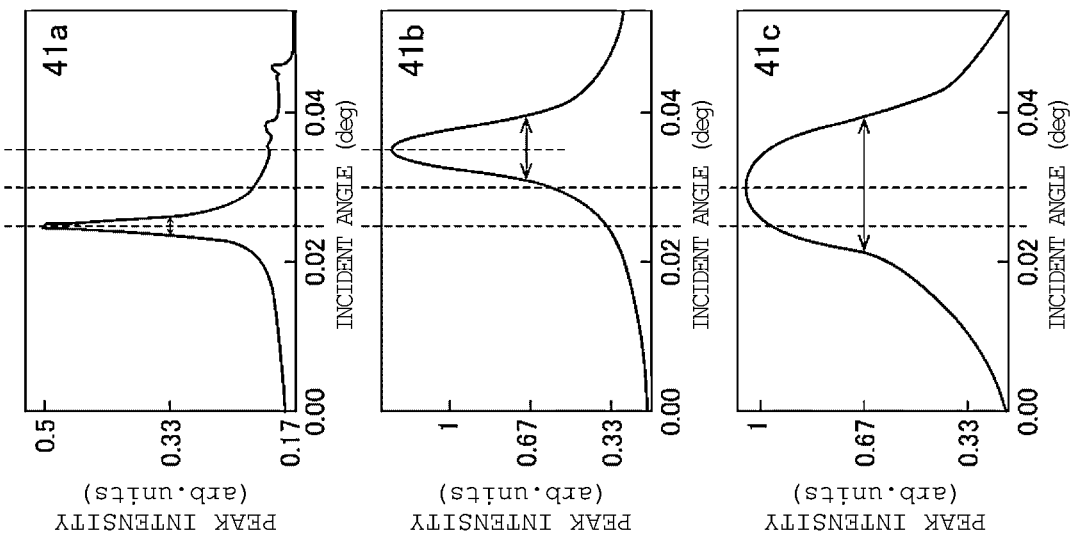
FIGS. 3A and 3B are diagrams illustrating X-ray rocking curves measured in each portion of a first sample, in the first embodiment.
Figure 3A:
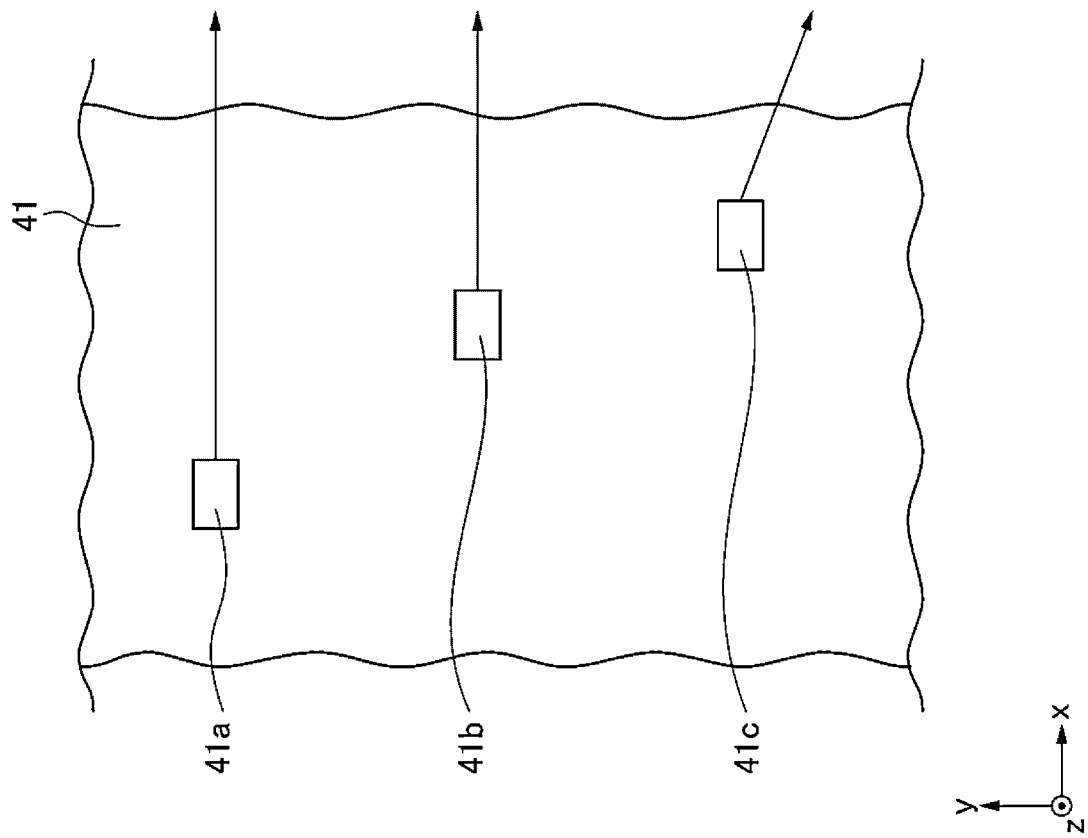

FIGS. 3A and 3B are diagrams illustrating X-ray rocking curves measured in each portion of a first sample 41 in the first embodiment. FIG. 3A illustrates a schematic upper view of the first sample 41. Further, a first portion 41a, a second portion 41b, and a third portion 41c provided on the first sample 41 are illustrated. FIG. 3B illustrates an X-ray rocking curve measured in the first portion 41a, an X-ray rocking curve measured in the second portion 41b, and an X-ray rocking curve measured in the third portion 41c.

When looking at the rocking curve measured in the first portion 41a, a peak having intensity of about 0.5 is observed near an incident angle of 0.025 deg. Further, a half width of the peak is about 0.003 deg.

When looking at a rocking curve measured in the second portion 41b, a peak having intensity of about 1.2 is observed near a greater incident angle of 0.036 deg. Further, a half width of the peak is greater, that is about 0.01 deg.

When looking at the rocking curve measured in the third portion 41c, a peak is observed near 0.03 deg which is greater than the incident angle observed in the first portion 41a and less than the incident angle observed in the second portion 41*b*. Intensity of the peak is about 1.1 which is greater than the intensity of the peak observed in the first portion 41*a* and less than the intensity of the peak observed in the second portion 41*b*. A half width of the peak is about 0.02 deg which is greater than the peak measured in the first portion 41*a* and the peak measured in the second portion 41*b*.

As described above, peaks of different incident angles, different intensities, and different half widths are observed in different portions (the first portion 41*a*, the second portion 41*b*, and the third portion 41*c*) of the first sample 41.

Next, action and effect of the present embodiment will be described.

An evaluation device for a sample having a crystalline material and using X-rays includes an evaluation device based on a topograph imaging method of imaging and evaluating a diffracted image from the entire sample, and an evaluation device based on a rocking curve method of obtaining an incident angle distribution of diffraction intensity from a portion of a sample.

FIGS. 4A to 4D are schematic diagrams illustrating results of evaluating the sample 40 by using an evaluation device based on the topograph imaging method, according to a comparative embodiment of the present embodiment. FIG. 4A illustrates a rocking curve corresponding to (422) plane reflection of silicon. FIG. 4B illustrates a diagram (denoted as "Low angle") in which topograph imaging was performed for an incident angle less than the incident angle corresponding to (422) plane reflection. FIG. 4C illustrates a diagram (denoted as "just Bragg") in which topograph imaging was performed at an incident angle corresponding to (422) plane reflection. FIG. 4D illustrates a diagram (denoted as "High angle") in which topograph imaging was performed for an incident angle greater than the incident angle corresponding to (422) plane reflection. Among FIGS. 4B, 4C, and 4D, FIG. 4D illustrates that a pattern formed on the sample 40 is most clearly observed. This suggests that silicon in an imaged portion of the sample 40 is distorted such that an incident angle of a rocking curve is increased. More specifically, this suggests interplanar spacing of crystal planes of silicon in the imaged portion of the sample 40 is reduced.

Furthermore, an in-plane distribution of crystal defects can be evaluated by analyzing a change in the pattern observed in the figure in the X and Y directions. As such, an evaluation device based on a topograph imaging method can evaluate a sample with crystallinity.

Meanwhile, in a case of the evaluation device based on the topograph imaging method, a method of observing crystal defects changes according to an incident angle of X-rays. It is ideal for quantitatively evaluating crystal defects to make measurement changing the incident angle of X-rays. Meanwhile, as illustrated in, for example, FIGS. 4B, 4C, and 4D, when an incident angle is changed, appearance of a pattern formed on the sample 40 is changed. Therefore, it is difficult to quantitatively compare and examine evaluation results of FIGS. 4B, 4C, and 4D. As a result, it is difficult to quantitatively evaluate crystal defects from an X-ray topograph image obtained through a topograph imaging method.

FIGS. 5A and 5B are schematic diagrams illustrating evaluation of the sample 40 including a substrate 40*a* and a thin film 40*c* formed on the substrate 40*a*. Here, it is assumed that the substrate 40*a* has crystallinity. The sample 40 is an example of the sample 40 used in the present embodiment.

FIG. 5A is a schematic diagram in a case where the sample 40 does not include the thin film 40*c*. Atoms 40*b* are arranged on the substrate 40*a* with a predetermined cycle. X-rays incident by the X-ray irradiation unit 11 are reflected and detected by the X-ray detection camera 14.

FIG. 5B is a diagram in a case where the sample 40 includes the thin film 40*c*. In a case where the thin film 40*c* is provided, atomic arrangement in the substrate 40*a* may be distorted. For example, an interatomic distance $L_2$ of the atoms 40*b* in the substrate 40*a* of FIG. 5B is longer than an interatomic distance $L_1$ illustrated in FIG. 5A as the sample 40 includes the thin film 40*c*. In this case, an interatomic distance in a crystal plane naturally changes. Further, an interval between the crystal planes also changes. Thereby, Bragg condition for reflecting X-rays also changes.

Figure 6A:
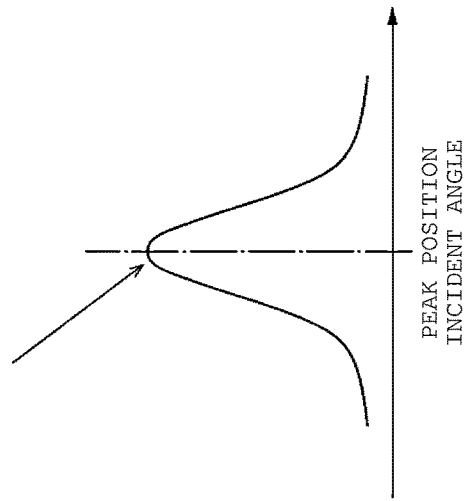
FIGS. 6A to 6C are diagrams illustrating action and effect of the first embodiment.
Figure 6B:
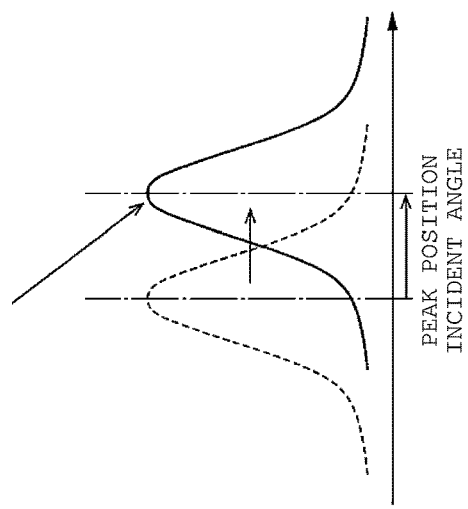
Figure 6C:
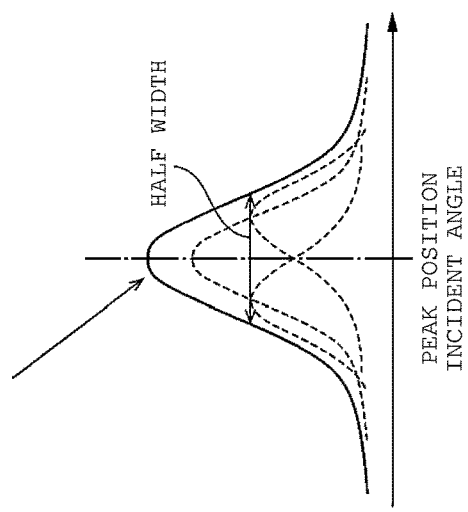

FIGS. 6A to 6C are diagrams illustrating action and effect of the present embodiment. FIG. 6A illustrates an X-ray rocking curve of the sample 40 having no distortion. FIG. 6B illustrates an example of an X-ray rocking curve of the sample 40 having distortion. For example, when X-rays are reflected on the larger incident angle side, a position of a peak of the X-ray rocking curve is observed on the larger incident angle side. FIG. 6C illustrates another example of the X-ray rocking curve of the sample 40 with distortion. When X-rays are simultaneously irradiated to portions having different incident angles, a plurality of peaks which are small and have different incident angles overlap each other as illustrated by dashed lines in FIG. 6C, and one peak is observed as illustrated by a solid line in FIG. 6C.

Then, in a case of an evaluation device based on a rocking curve method of obtaining an incident angle distribution of diffraction intensity from part of a sample, such as the evaluation device of the present embodiment, rocking curves when an incident angle is changed can be measured in the first portion 41*a*, the second portion 41*b*, and the third portion 41*c* of the sample. Furthermore, crystal defects or distortion of the first portion 41*a* can be evaluated based on a peak position (an incident angle), a peak intensity, and a half width of the peak of the rocking curve measured in the first portion 41*a*. The same applies to the second portion 41*b* and the third portion 41*c*.

According to the evaluation device of the present embodiment, the evaluation device capable of performing precise evaluation can be provided.

Second Embodiment

Description of content overlapping with the first embodiment is omitted.

Figure 7:
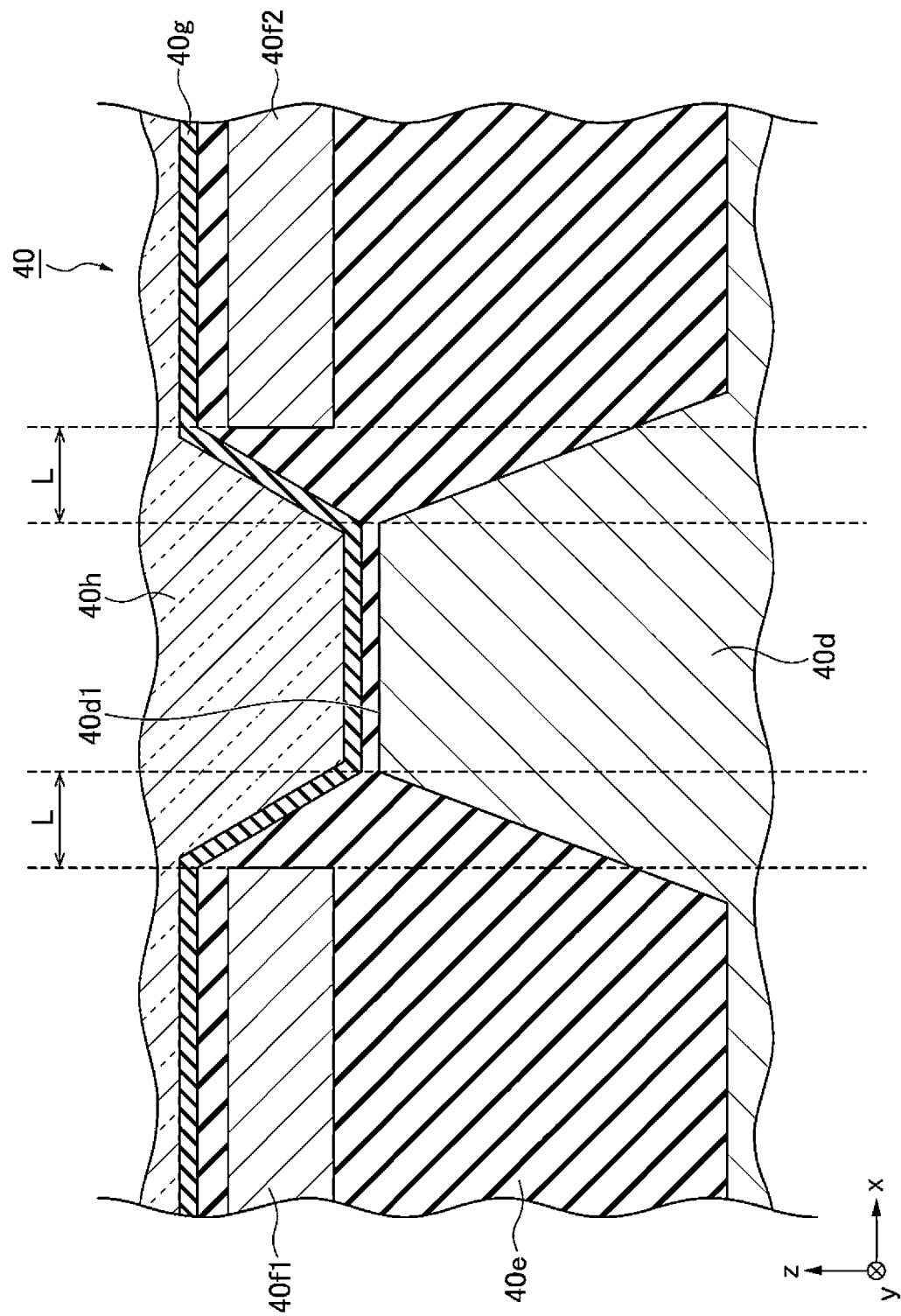
FIG. 7 is a schematic cross-sectional view of a sample evaluated by an evaluation device of a second embodiment.

FIG. 7 is a schematic cross-sectional view of the sample 40 evaluated by the evaluation device of the present embodiment. An insulating film 40*e* having an element separation function is formed around a semiconductor portion 40*d* having a trapezoidal cross section. The semiconductor portion 40*d* is configured to be adjacent to a pattern such as a memory cell array of a NAND memory having a three-dimensional structure. The semiconductor portion 40*d* has silicon as a crystalline material. Then, a gate electrode 40$f_1$ is provided in the upper left of the semiconductor portion 40*d* through the insulating film 40*e*. Further, a gate electrode 40$f_2$ is provided in the upper right of the semiconductor portion 40*d* through the insulating film 40*e*. Both portions 40*g* and 40*h* are insulating films, but materials thereof are different from each other. A distance between an upper surface 40$d_1$ of the semiconductor portion 40*d* in the X direction and the gate electrode 40$f_1$, and a distance between the upper surface 40$d_1$ of the semiconductor portion 40*d* in the X direction and the gate electrode $40f_2$ are referred to as L. Here, crystal defects or distortion may occur in the semiconductor portion $40d$, depending on the distance L. The present embodiment describes evaluation of the crystal defects or distortion.

Figure 8:
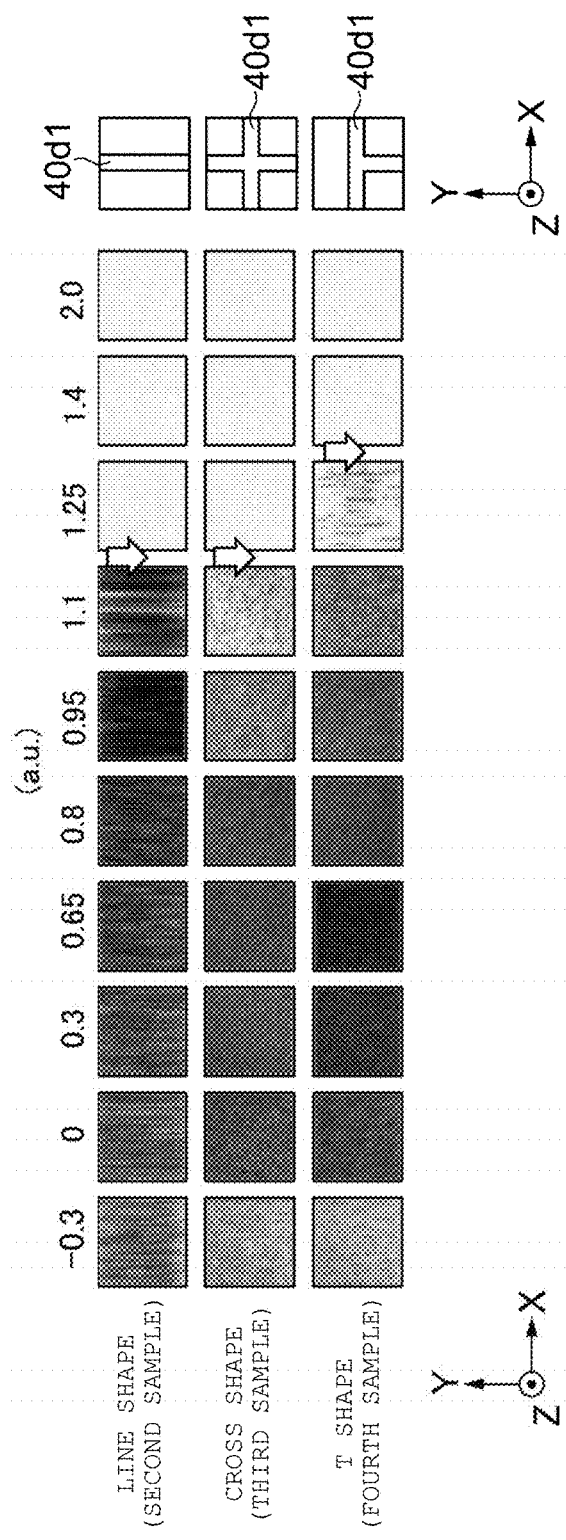
FIGS. 8A and 8B are schematic diagrams illustrating evaluation results of a second sample, a third sample, and a fourth sample, in a comparative embodiment of the second embodiment.

FIGS. 8A and 8B are schematic diagrams illustrating evaluation results of the second sample, the third sample, and the fourth sample in the comparative embodiment of the present embodiment.

FIG. 8B is a schematic diagram illustrating differences between the second sample, the third sample, and the fourth sample. FIG. 8B is a schematic diagram illustrating shapes of the upper surface $40d_1$ of the semiconductor portion $40d$ when viewed from the Z direction. In the second sample, the upper surface $40d_1$ has a line shape extending in the Y direction. In the third sample, the upper surface $40d_1$ has a cross shape extending in the X direction and the Y direction. In the fourth sample, the upper surface $40d_1$ that does not extend in the Y direction beyond a portion thereof extending in the X direction is formed. The upper surface $40d_1$ of the fourth sample has a T shape.

FIG. 8A is a schematic diagram illustrating results obtained by evaluating the second sample, the third sample, and the fourth sample in different distances L (−0.3, 0, 0.3, 0.65, 0.80, 0.95, 1.1, 1.25, 1.4, and 2.0 where, L is an arbitrary unit (abbreviated as a.u.) and the same is applied hereinafter) by using a topograph imaging method. A plurality of basic patterns illustrated in FIGS. 7 and 8B are arranged in a square region. A contrast image in the square region is an image taken by an X-ray topograph, and a difference in shading is checked by a difference in crystal defects and distortion. A defect rate of crystal defects can be defined by standardizing a degree of the shading. That is, when contrast is dark, the defect rate is high, and conversely, when contrast is light, the defect rate is low. In the second sample and the third sample, L=1.25 or more, and in the fourth sample, L=1.4 or more, contrast is light, and a defect rate is very low. Meanwhile, in the comparative embodiment, although presence or absence of crystal defects could be determined, the crystal defects and distortion could not be quantitatively evaluated.

Figure 9:
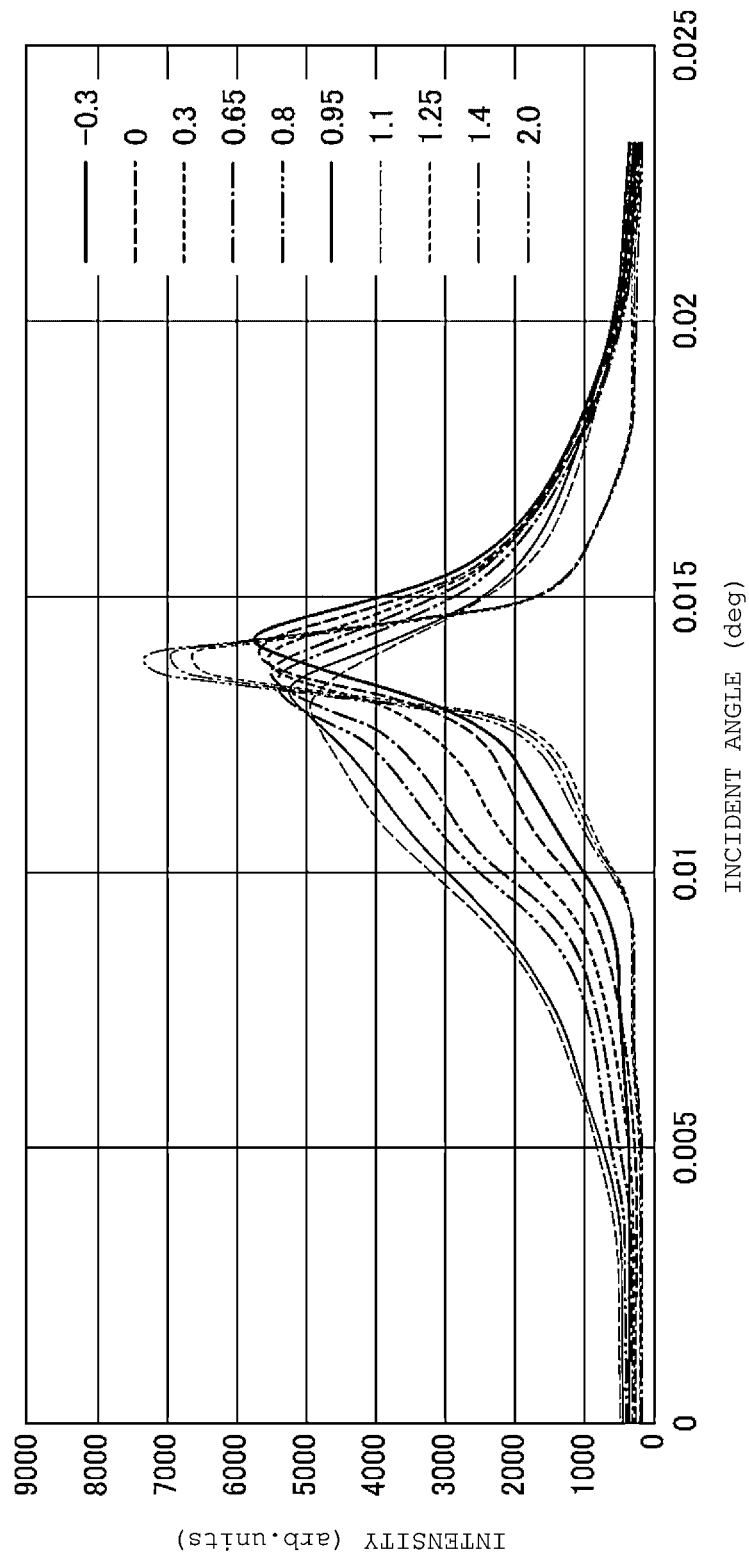
FIG. 9 is a diagram illustrating X-ray rocking curves measured in the second sample of the second embodiment.

FIG. 9 is a diagram illustrating X-ray rocking curves measured in different distances L for the second sample of the present embodiment. The X-ray rocking curves illustrated in FIG. 9 correspond to (422) plane reflection of silicon. Main peaks of the X-ray rocking curves are observed near an incident angle of 0.014 deg. Further, sub-peaks of the X-ray rocking curves are observed near or less than an incident angle of 0.014 deg.

Figure 10B:
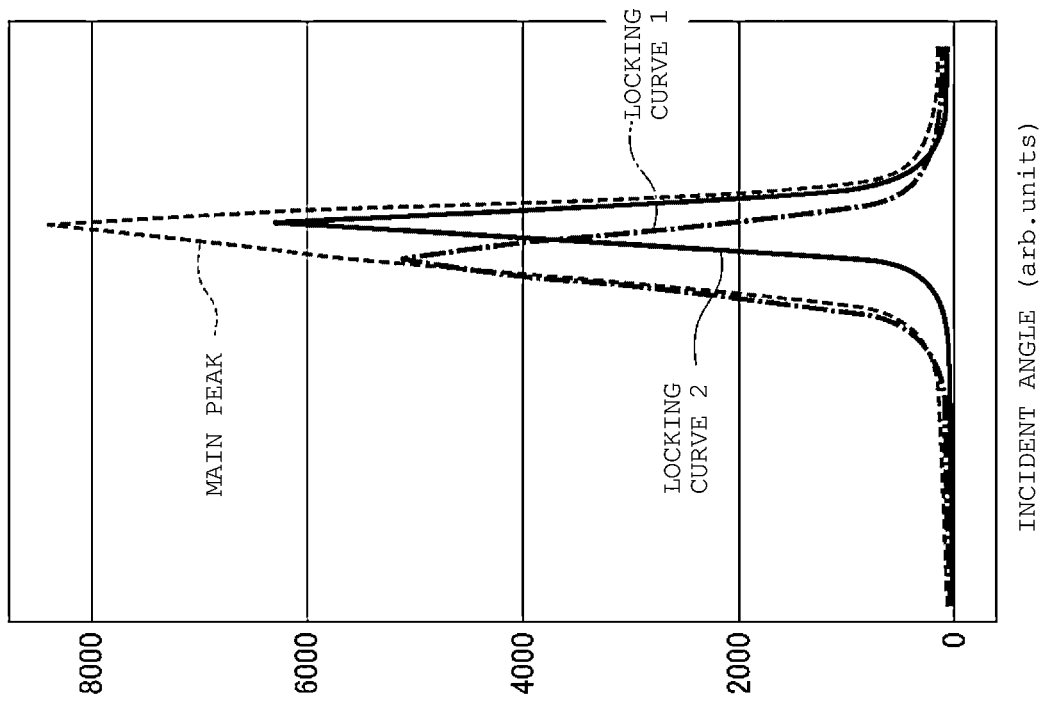
FIGS. 10A and 10B are examples of function fitting performed on an X-ray rocking curve.
Figure 10A:
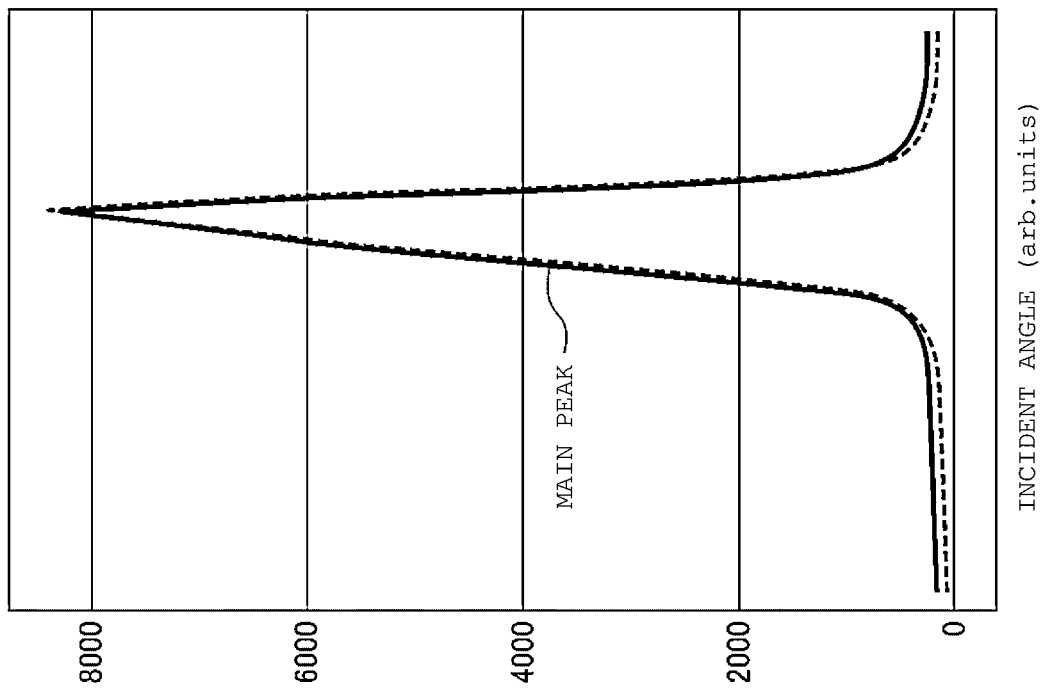

FIGS. 10A and 10B are examples of function fitting performed on the main peak of the X-ray rocking curve. FIG. 10A illustrates a measured X-ray rocking curve. Further, FIG. 10B illustrates that a main peak of the X-ray rocking curve illustrated in FIG. 10A is fitted as the sum of a rocking curve 1 and a rocking curve 2. The rocking curve 1 and the rocking curve 2 can be generated by using, for example, a Gaussian function or a Lorentzian function. A function used for fitting is not limited to the Gaussian function or the Lorentzian function.

Figure 11:
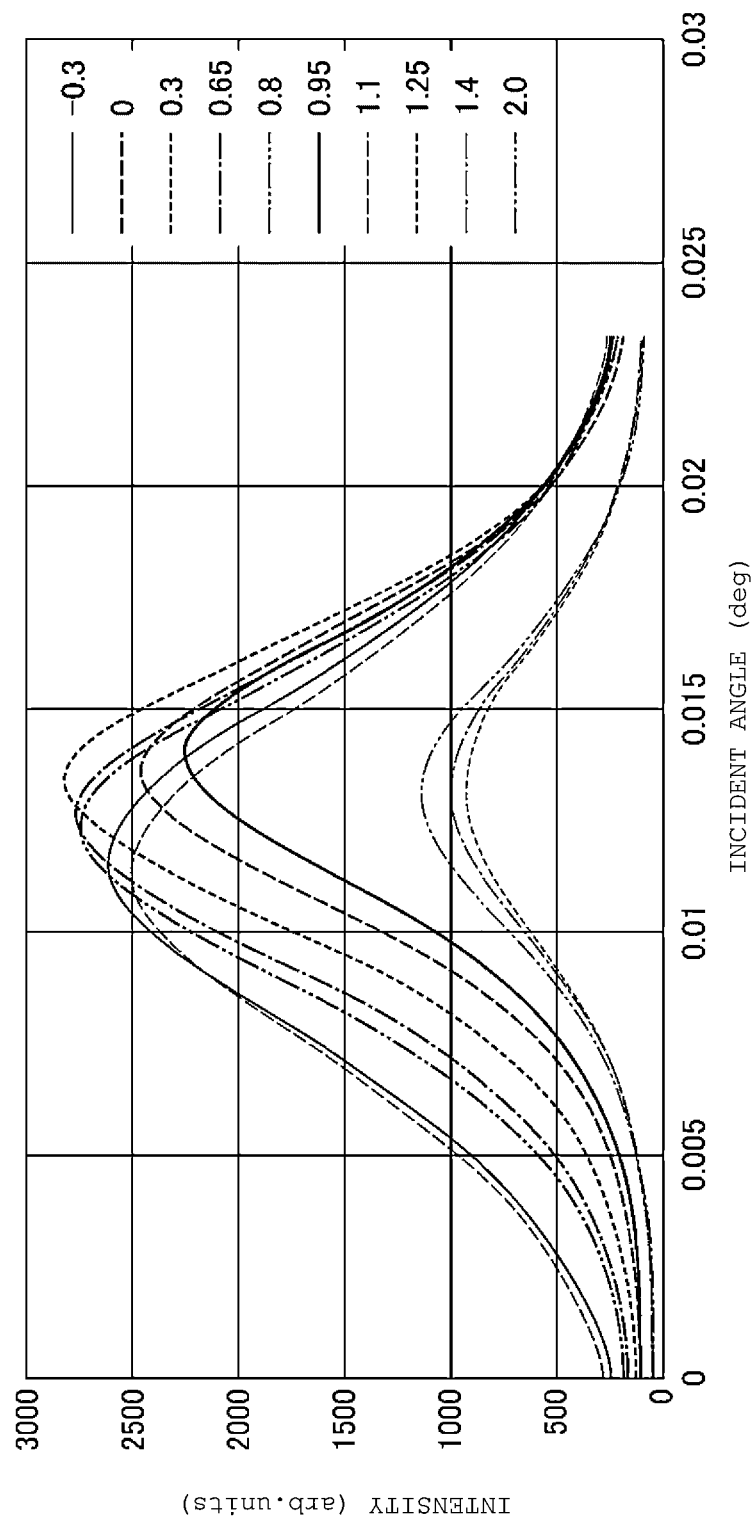
FIG. 11 is a diagram illustrating sub-peaks, which are separated from main peaks, of X-ray rocking curves measured in the second sample of the second embodiment.

FIG. 11 is a diagram illustrating sub-peaks, which are separated from main peaks, of X-ray rocking curves measured in the second sample of the present embodiment. The sub-peaks have information on crystal defects or distortion.

For example, crystal defects or distortion related to an interval between crystal planes can be evaluated from incident angles of the sub-peaks. Assuming that the interval between crystal planes is d, a margin of an incident angle is θ, λ is a wavelength of an X ray, and n is a natural number, a relationship of $2d\sin\theta = n\lambda$ (Bragg's law) is established. Accordingly, crystal defects or distortion related to the interval between crystal planes may be evaluated from an incident angle.

Further, for example, a crystallite size of a portion of crystal defects or distortion can be evaluated from a half width of a sub-peak. Generally, as the crystallite size is reduced, the half width tends to increase. Accordingly, the crystallite size of the portion of the crystal defects or distortion may be evaluated from the half width of the sub-peak.

Evaluation results derived from the sub-peaks are not limited thereto.

Figure 12:
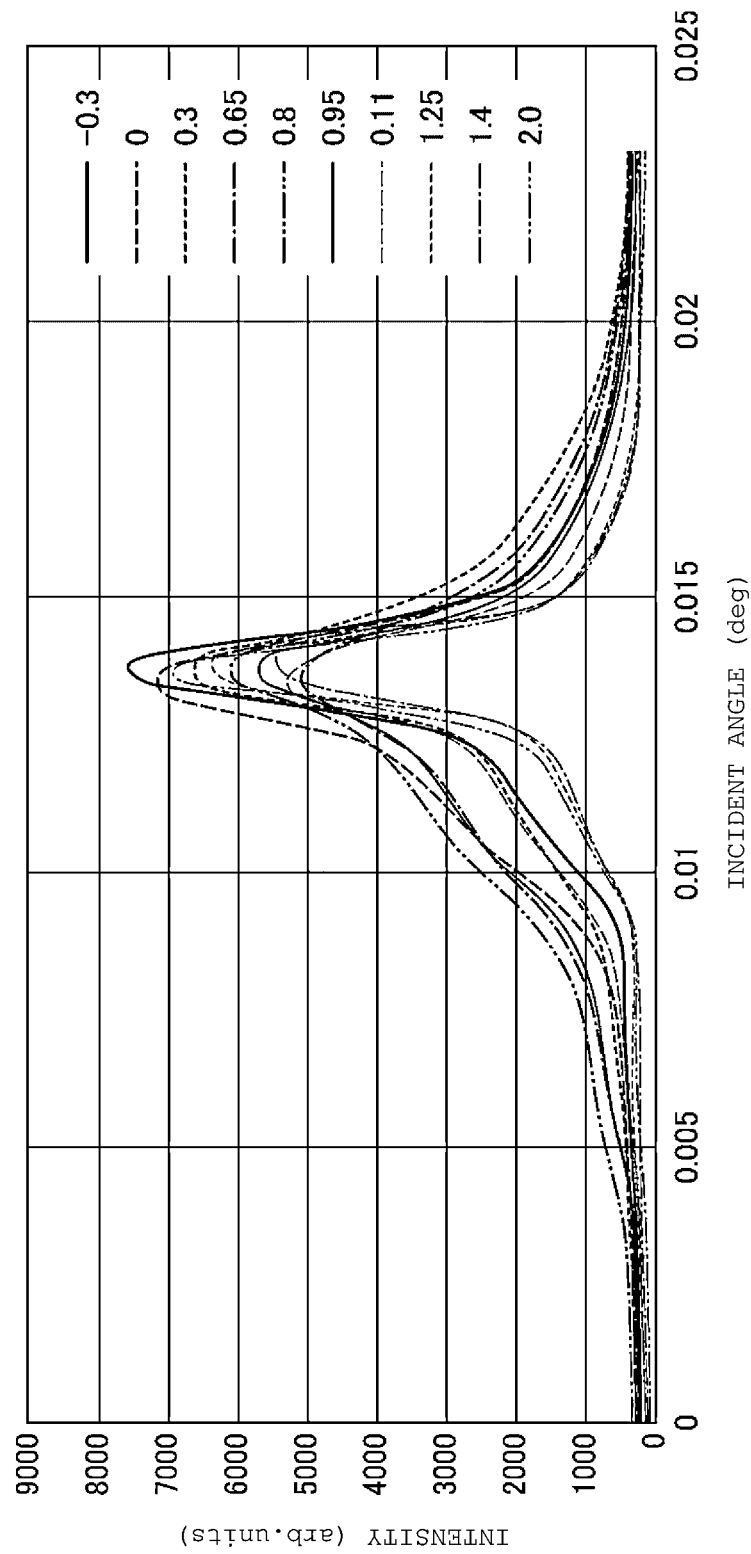
FIG. 12 is a diagram illustrating X-ray rocking curves measured in the third sample of the second embodiment.
Figure 13:
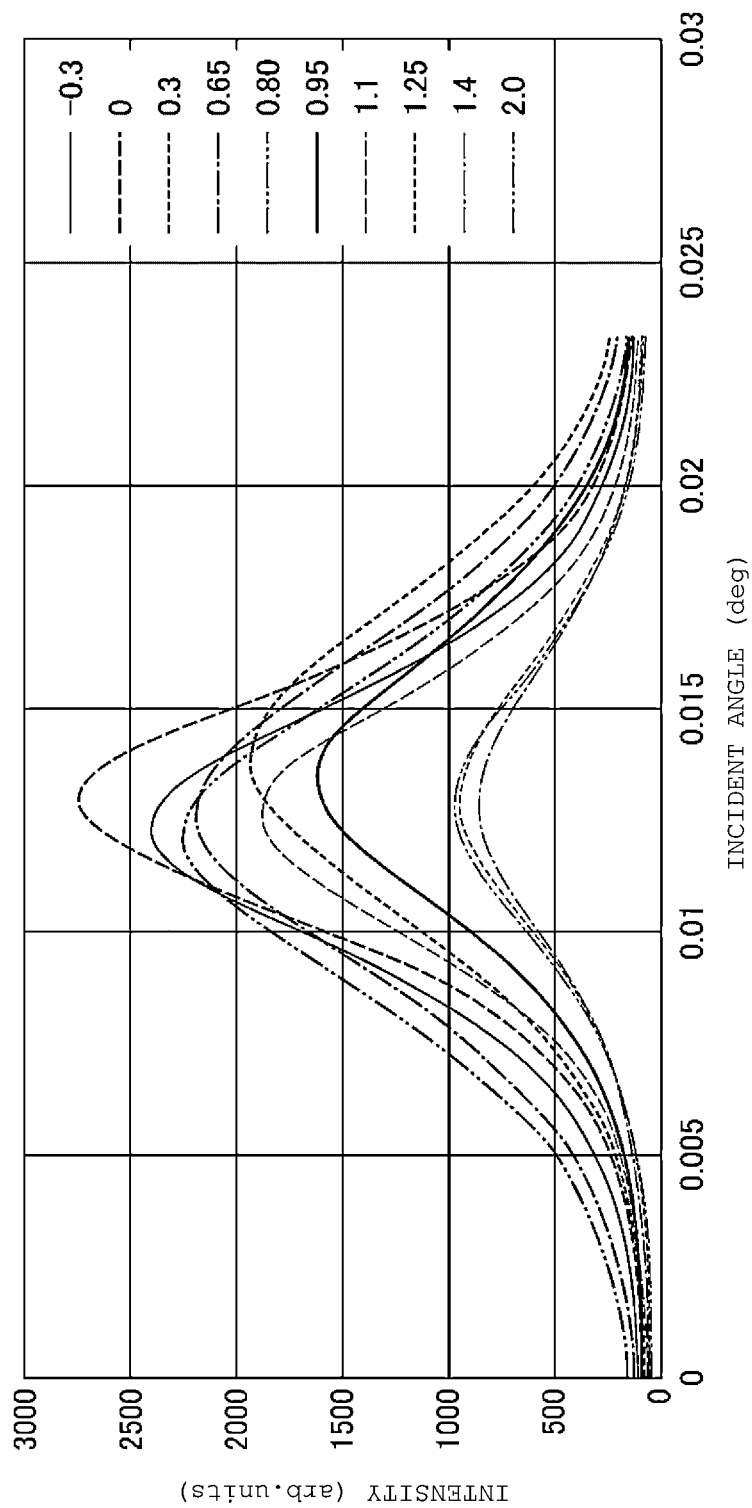
FIG. 13 is a diagram illustrating sub-peaks, which are separated from main peaks, of the X-ray rocking curves measured in the third sample of the second embodiment.
Figure 14:
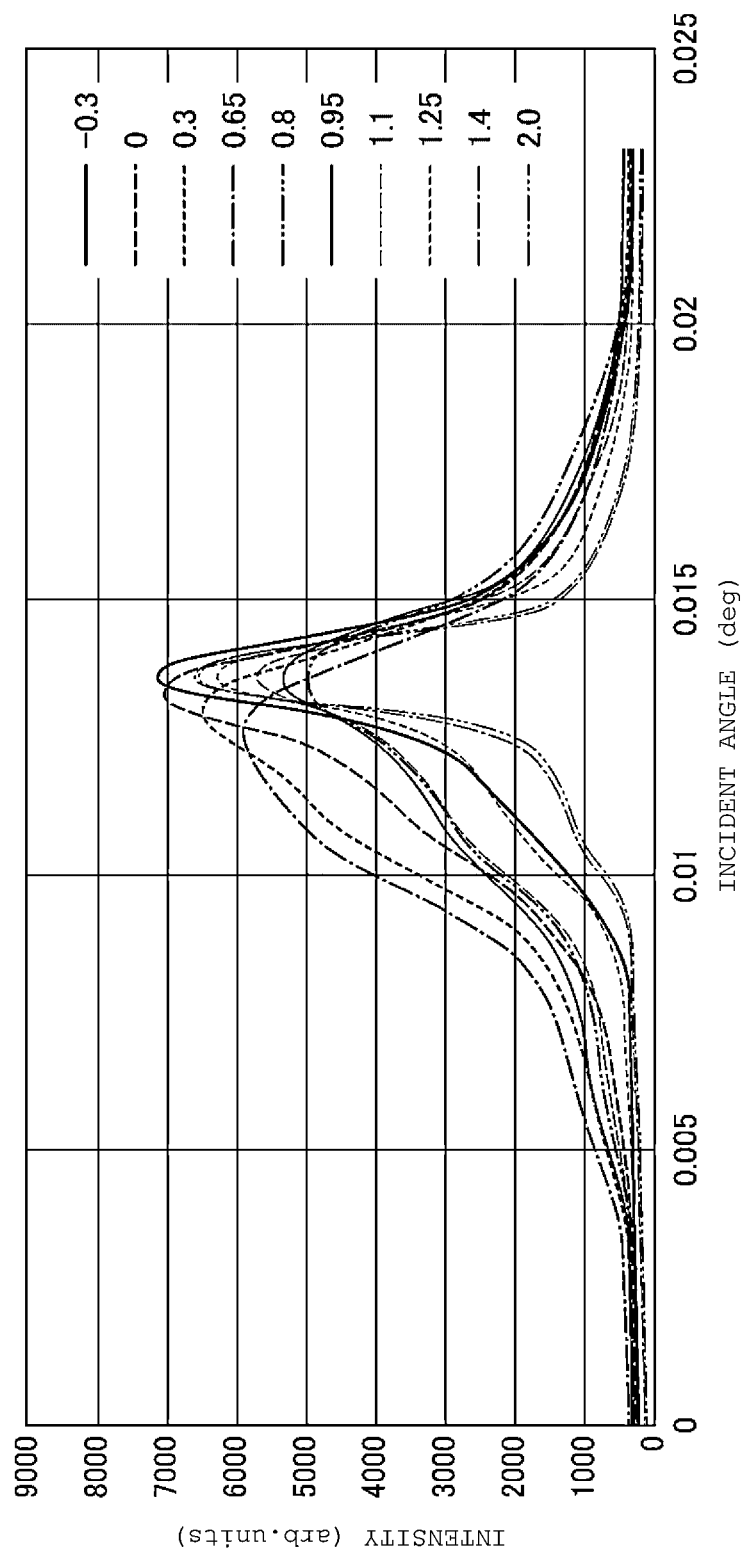
FIG. 14 is a diagram illustrating X-ray rocking curves measured in the fourth sample of the second embodiment.
Figure 15:
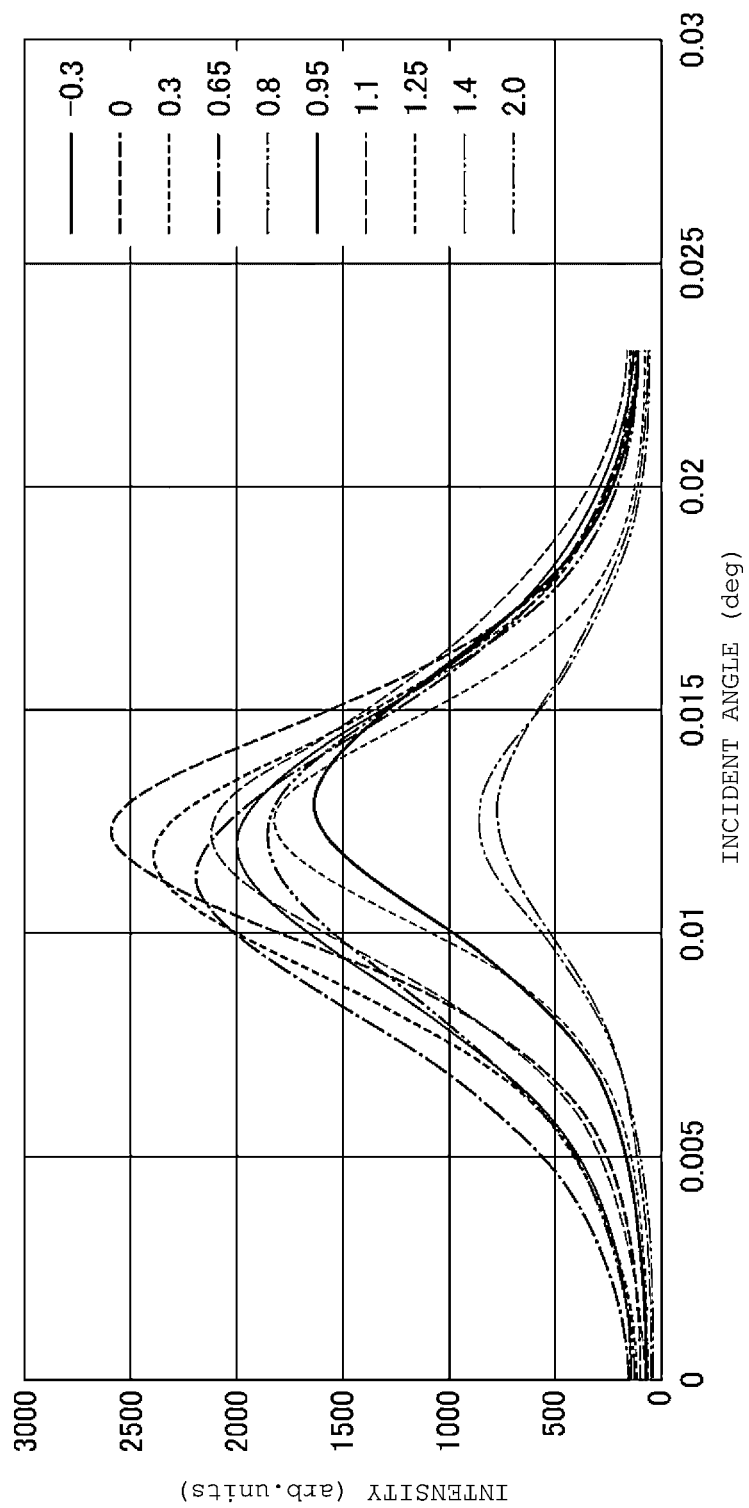
FIG. 15 is a diagram illustrating sub-peaks, which are separated from main peaks, of the X-ray rocking curves measured in the fourth sample of the second embodiment.

FIG. 12 is a diagram illustrating X-ray rocking curves measured in the third sample of the present embodiment. FIG. 13 is a diagram illustrating sub-peaks, which are separated from main peaks, of X-ray rocking curves measured in the third sample of the present embodiment. FIG. 14 is a diagram illustrating X-ray rocking curves measured in the fourth sample of the present embodiment. FIG. 15 is a diagram illustrating sub-peaks, which are separated from main peaks, of X-ray rocking curves measured in the fourth sample of the second embodiment. The third sample and the fourth sample can be evaluated in the same manner as the second sample.

According to the evaluation device of the present embodiment, the evaluation device capable of performing precise evaluation can be provided.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An evaluation device comprising:
an X-ray diffraction measuring device including:
a sample stage on which a sample having a first portion having a crystalline material is mounted, the first portion of the sample including:
a semiconductor portion formed into a trapezoidal cross section and having the crystalline material;
an insulating film formed around the semiconductor portion;
a first gate electrode provided in the insulating film at one side of the semiconductor portion to be distant from an upper surface of the semiconductor portion with a distance; and
a second gate electrode provided in the insulating film at the other side of the semiconductor portion to be distant from the upper surface of the semiconductor portion with the distance;
a motor configured to drive the sample stage;
an X-ray source configured to irradiate the first portion of the sample on the sample stage with an X-ray; and
an X-ray detection camera including two-dimensionally-arranged detection elements to each detect a diffracted X-ray generated as a result of irradiation of the first portion of the sample and configured to output a contrast image based on the diffracted X-ray detected pixel by pixel through the two-dimensionally-arranged detection elements;

a controller configured to control the X-ray diffraction measuring device to acquire a first X-ray rocking curve having a first main peak and a first sub-peak partially overlapped with the first main peak by performing a first X-ray rocking curve measurement on the first portion of the sample; and an analysis device comprising at least one processor with a memory comprising a program, that when executed by the at least one processor, causes the at least one processor to perform:

analyze the contrast image to determine whether a shape of the semiconductor portion in the first portion of the sample in a plan view corresponds to one of a line shape, a cross shape or a T shape and to standardize a degree of shading of the contrast image;

perform a separation process on data corresponding to the first X-ray rocking curve to separate the first sub-peak from the first main peak;

perform a first evaluation process on the separated first sub-peak to generate first evaluation formation of a crystal defect or distortion of the first portion of the sample based on a peak position, a peak intensity, and a half width of the separated first sub-peak, the first evaluation information including: (i) a crystallite size of the crystal defect or distortion based on an inverse relationship between the half width and the crystallite size; and (ii) a defect rate of the crystal defect or distortion based on the determined shape of the semiconductor portion in the first portion, the standardized degree of shading of the contrast image, and the peak position, the peak intensity and the half width of the separated first sub-peak; and output the first evaluation information of the crystal defect or distortion of the first portion of the sample.

2. The evaluation device according to claim 1, wherein the analysis device is configured to separate the first sub-peak from the first main peak by function fitting.

3. The evaluation device according to claim 2, wherein the function fitting is performed based on a Gaussian function or a Lorentzian function.

4. The evaluation device according to claim 1, wherein the X-ray diffraction measuring device is further configured to acquire a second X-ray rocking curve having a second main peak and a second sub-peak partially overlapped with the second main peak by measuring an X-ray rocking curve of a second portion of the sample, and the analysis device is further configured to:

separate the second sub-peak from the second main peak;

perform a second evaluation process on the separated second sub-peak to generate second evaluation information of a crystal defect or distortion of the second portion of the sample based on a peak position, a peak intensity, and a half width of the separated second sub-peak, the second evaluation information including a crystallite size of the crystal defect or distortion based on an inverse relationship between the half width and the crystallite size; and output the second evaluation information of the crystal defect or distortion of the second portion of the sample.

5. The evaluation device according to claim 4, wherein the analysis device is configured to output the first evaluation information and the second evaluation information by mapping and displaying the first evaluation information and the second evaluation information with respect to a position of the sample including the first portion and the second portion.

6. The evaluation device according to claim 3, wherein the analysis device is configured to separate the second sub-peak from the second main peak by function fitting.

7. The evaluation device according to claim 6, wherein the function fitting is performed based on a Gaussian function or a Lorentzian function.

8. A method, comprising:

acquiring a first X-ray rocking curve, associated with a first portion of a sample having a crystalline material, that has a first main peak and a first sub-peak partially overlapped with the first main peak, wherein the first portion of the sample includes:

a semiconductor portion formed into a trapezoidal cross section and having the crystalline material;

an insulating film formed around the semiconductor portion;

a first gate electrode provided in the insulating film at one side of the semiconductor portion to be distant from an upper surface of the semiconductor portion with a distance; and a second gate electrode provided in the insulating film at the other side of the semiconductor portion to be distant from the upper surface of the semiconductor portion with the distance;

analyzing a contrast image to determine whether a shape of the semiconductor portion in the first portion of the sample in a plan view corresponds to one of a line shape, a cross shape or a T shape and to standardize a degree of shading of the contrast image;

performing a separation process on data corresponding to the first X-ray rocking curve to separating the first sub-peak from the first main peak;

performing a first evaluation process on the separated first sub-peak to generate first evaluation information of a crystal defect or distortion of the first portion based on a peak position, a peak intensity, and a half width of the separated first, sub-peak, the first evaluation information including: (i) a crystallite size of the crystal defect or distortion based on an inverse relationship between the half width and the crystallite size; and (ii) a defect rate of the crystal defect or distortion based on the determined shape of the semiconductor portion in the first portion, the standardized degree of shading of the contrast image, and the peak position, the peak intensity and the half width of the separated first sub-peak; and outputting the first evaluation information of the crystal defect or distortion of the first portion of the sample.

9. The method of claim 8, further comprising separating the first sub-peak from the first main peak by function fitting.

10. The method of claim 9, wherein the function fitting is performed based on a Gaussian function or a Lorentzian function.

11. The method of claim 8, further comprising:

acquiring a second X-ray rocking curve, associated with a second portion of the sample, that has a second main peak and a second sub-peak partially overlapped with the second main peak;

separating the second sub-peak from the second main peak;

performing a second evaluation process on the second portion of the sample to generate second evaluation information of a crystal defect or distortion of the second portion based on a peak position, a peak intensity, and a half width of the separated second sub-peak, the second evaluation information including a crystallite size of the crystal defect or distortion based on an inverse relationship between the half width and the crystallite size; and outputting the second evaluation information of the crystal defect or distortion of the second portion of the sample.

12. The method of claim 11, further comprising outputting the first evaluation information and the second evaluation information by mapping and displaying the first evaluation information and the second evaluation information with respect to a position of the sample including the first portion and the second portion.

* * * * *